Figure 1:
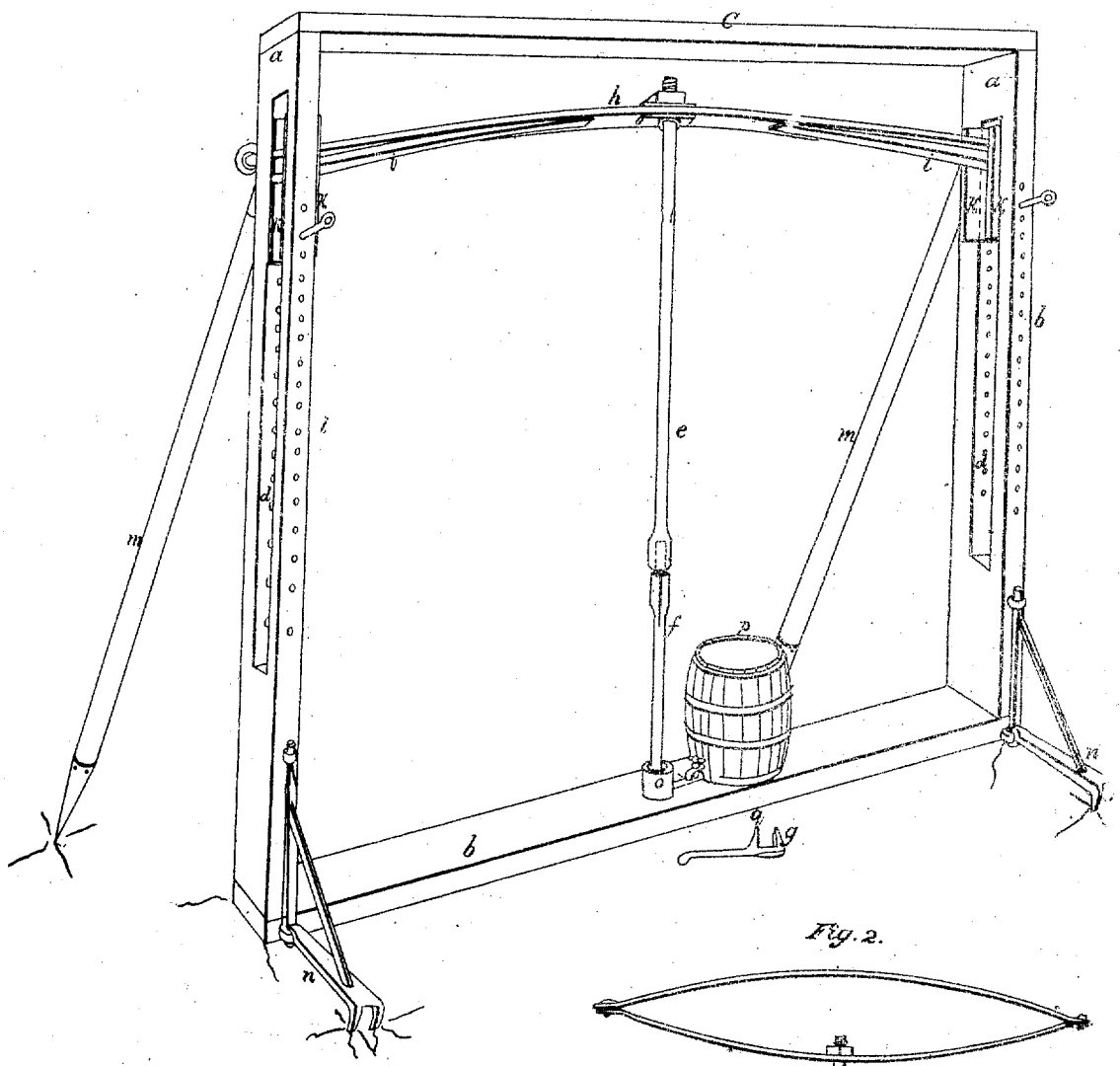
Figure 2:
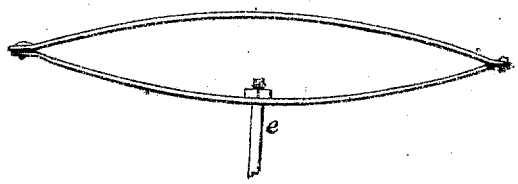

5932X

J. Overall,

Boring Artesian Wells.

Patented Apr. 23, 1830.

NO PRINTED COPY OF SPECIFICATION IN OFFICE.

X5432 Apr 23. 1830 [illegible]

Isreal Overall. a Citizen of

Letters Patent.

The Schedule referred to in these Letters Patent, and making part of the same containing a description in the words of the said Isreal Overall, himself of his improvement in the machine for boring holes in Rocks.

Be it known that I, Isreal Overall, of Liberty, Smith County, West Tennessee, have made an improvement in the machine for boring holes in rocks; which is described as follows.

This Machine consists of the following principal parts. 1. The frame 2 The auger & driver. — 3 The springs. 4 The side & bottom supports.

1 The Frame is constructed by framing together two posts about 7 feet high, & about 4 by 8 inches thick, more or less. The Sill being about 7 feet wide, & of the same thickness as the posts. In the two posts & within about one foot of the top, are made two Mortises about one inch wide & 3½ feet long, to admit the side springs to be hereafter described.

2. The auger & driver. The driver is about 4 feet long, made of round wrought iron, having a screw & nut on the top, & a female screw to receive the auger. The auger or bit is about 3 feet long & made in the usual way. On the top of the auger is a screw by which it is united to the driver, by means of a square collar & the use of a wrench to screw it to the driver.

3. The Springs. The top spring is made of wood about six feet long & of sufficient strength for the purpose intended; This spring is fastened to the top of the driver by the nut & screw before mentioned. In the centre of this spring are two iron plates, one above & the other below to prevent it from wearing. This spring may be of a spiral or any other form. The side springs are also made of wood, placed under the ends of the top springs, & are connected with four guides, two on each side of the frames, & work up & down in the side mortises before mentioned, which are supported at proper heights by pins put into the holes in the

[illegible]

X5 [illegible]

the side pieces, or these may be two springs connected together at their [illegible]
ends, similar to carriage springs  with an iron rod passing thro'
two cap pieces, to the upper spring fastened by nuts & screws; the iron
is attached to the lower spring by screw & nut & regulated by a pin
passing thro' the iron rod. The frame & springs may be applied
to any improvement already patented. The top & bottom supports
There are two top supports about 7 feet high of proper strength, &
the lower points shod with iron to lay hold of the ground. They are
suspended by hinges or joints from the side pieces near their tops. The
bottom supports are made of iron or wood, with points to lay hold
of the ground. A guide, having an opening in it, is let into the
sill, thro' which the auger passes, & which keeps it in a proper
direction whilst boring. On the upper surface of the lower sill
is a vessel containing water which is conducted to the opening
thro' the sill. Operation. The machine is placed over the rock
to be bored, & the auger & driver put in the direction in which the
hole is intended to be bored. The top & bottom supports are made
to bear solidly. The auger is brought thro' the guide in the sill, & the
boring commenced; the top & side springs, supporting much of the
weight of the driver & auger or bit.—

What I claim as my invention, & wish to secure by
Patent, is the construction of the whole of the above described
machine; except the auger or bit. For a further illustration
of my invention, I refer to the model & drawing of the same
deposited in the Patent Office—

In Testimony that the foregoing is a true Specification
of my invention, I have made oath to the same, & subscribed
my name before two two Witnesses at the City of Washington
this 8th day of April 1836.

Witnesses
[illegible] William P. Elliot
[illegible] Thomas [illegible]

[illegible]

[illegible]

(April 23 1836)